(12) United States Patent
Tazbaz et al.

(10) Patent No.: US 10,024,090 B2
(45) Date of Patent: Jul. 17, 2018

(54) REMOVABLE COUPLERS FOR ASSEMBLY OF AN INTEGRATED MULTI-PIVOT HINGE MODULE

(71) Applicant: Microsoft Technology Licensing, LLC, Redmond, WA (US)

(72) Inventors: Errol M. Tazbaz, Bellevue, WA (US); Brian Bitz, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 15/255,320

(22) Filed: Sep. 2, 2016

(65) Prior Publication Data

US 2018/0066464 A1    Mar. 8, 2018

(51) Int. Cl.
| | |
|---|---|
| *E05D 15/00* | (2006.01) |
| *E05D 11/00* | (2006.01) |
| *A45C 11/00* | (2006.01) |
| *A45C 13/00* | (2006.01) |
| *E05D 3/06* | (2006.01) |
| *E05D 7/12* | (2006.01) |
| *E05D 11/06* | (2006.01) |
| *G06F 1/16* | (2006.01) |
| *H04M 1/02* | (2006.01) |

(52) U.S. Cl.
CPC .......... *E05D 11/0054* (2013.01); *A45C 11/00* (2013.01); *A45C 13/005* (2013.01); *E05D 3/06* (2013.01); *E05D 7/12* (2013.01); *E05D 11/06* (2013.01); *E05D 15/00* (2013.01); *G06F 1/1681* (2013.01); *H04M 1/022* (2013.01); *H04M 1/0216* (2013.01); *A45C 2011/003* (2013.01); *E05D 2007/128* (2013.01); *E05D 2011/0072* (2013.01); *E05Y 2900/606* (2013.01)

(58) Field of Classification Search
CPC .... E05D 3/06; E05D 3/12; E05D 3/14; E05D 7/12; E05D 11/0054; E05D 15/00; E05Y 2900/606; A45C 11/00; A45C 13/005
USPC ................................... 16/365, 366, 369, 370
See application file for complete search history.

(56) References Cited

U.S. PATENT DOCUMENTS

| | | | |
|---|---|---|---|
| 6,223,393 B1 * | 5/2001 | Knopf ................... | G06F 1/1618 16/366 |
| 8,713,759 B2 * | 5/2014 | Cai ....................... | G06F 1/1681 16/366 |

(Continued)

OTHER PUBLICATIONS

"International Search Report and Written Opinion Issued in PCT Application No. PCT/US2017/048773", dated Nov. 16, 2017, 13 Pages.

*Primary Examiner* — Roberta S Delisle
(74) *Attorney, Agent, or Firm* — Talem IP Law, LLP (57) ABSTRACT

Technologies are described for a set of removable couplers configured to secure sequential hinge covers over a sequential multi-pivot hinge module for rotatably securing portions of a computing device. The removable couplers may be configured to engage each end of a shaft, where the shaft rotatably couples frames of the multi-pivot hinge module together. Each of the removable couplers may include threaded holes for engaging a fastening component to secure a hinge cover over each frame. The hinge covers may be installed sequentially over each frame of the multi-pivot hinge module, by installing a frame, attaching removable couplers and securing the hinge cover, and repeating the process for each hinge cover.

14 Claims, 8 Drawing Sheets

(56) References Cited

U.S. PATENT DOCUMENTS

| | | | |
|---|---|---|---|
| 8,813,312 B2* | 8/2014 | Song | G06F 1/1601 16/225 |
| 2014/0196254 A1* | 7/2014 | Song | E05D 3/14 16/302 |
| 2014/0245569 A1* | 9/2014 | Cho | E05D 3/122 16/370 |
| 2015/0184439 A1 | 7/2015 | Hsu | |
| 2015/0277506 A1* | 10/2015 | Cheah | G06F 1/1681 361/679.27 |
| 2016/0132075 A1 | 5/2016 | Tazbaz | |
| 2016/0132076 A1 | 5/2016 | Bitz et al. | |
| 2016/0139634 A1* | 5/2016 | Cho | G06F 1/1652 361/679.27 |
| 2016/0147267 A1 | 5/2016 | Campbell et al. | |
| 2016/0187935 A1 | 6/2016 | Tazbaz et al. | |
| 2016/0215541 A1 | 7/2016 | Tazbaz et al. | |

\* cited by examiner

REMOVABLE COUPLERS FOR ASSEMBLY OF AN INTEGRATED MULTI-PIVOT HINGE MODULE

BACKGROUND

Some computing devices, such as a tablet or a touch screen device, can be used for a variety of purposes including displaying books, interacting with applications, browsing the Internet, reading email, or other similar activities. For certain applications, more processing power and input capabilities are desired. Input devices, such as keyboards, can be attached to tablet devices to allow additional interactions, such as, editing documents, filling in forms, composing emails, and other similar activities. The attachment of input devices, such as a keyboard, enable tablet-style computing devices to provide the convenience similar to a laptop and enable lap-top style computing devices to have the flexibility similar to a tablet.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

Technologies are described for a set of removable couplers configured to secure sequential hinge covers over a sequential multi-pivot hinge module for rotatably securing portions of a computing device. The removable couplers may be configured to engage each end of a shaft, where the shaft rotatably couples frames of the multi-pivot hinge module together. Each of the removable couplers may include threaded holes for engaging a fastening component to secure a hinge cover over each frame. The hinge covers may be installed sequentially over each frame of the multi-pivot hinge module, by installing a frame, attaching removable couplers and securing the hinge cover, and repeating the process for each hinge cover.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the scope of the claimed subject matter.

Figure 1A:
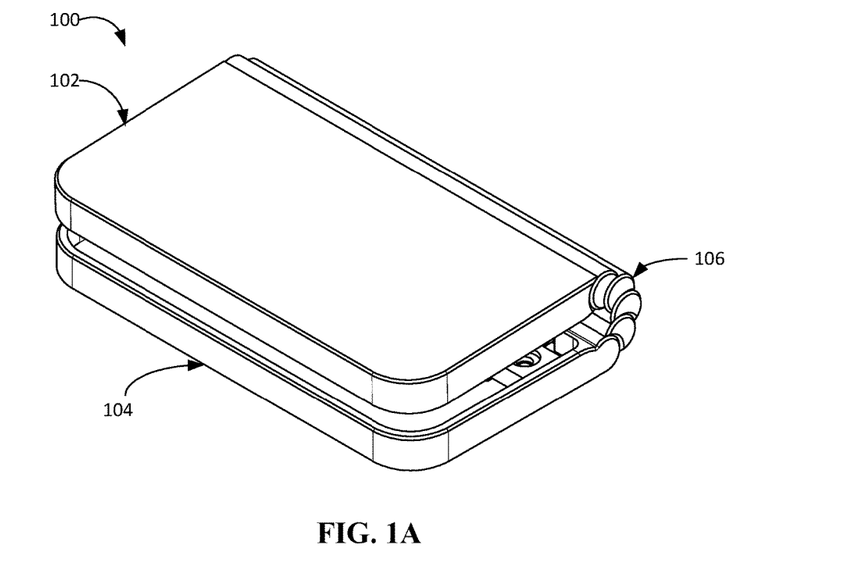
FIGS. 1A-1C illustrate perspective views of an example device that includes removable couplers for a sequential multi-pivot hinge assembly.
Figure 1B:
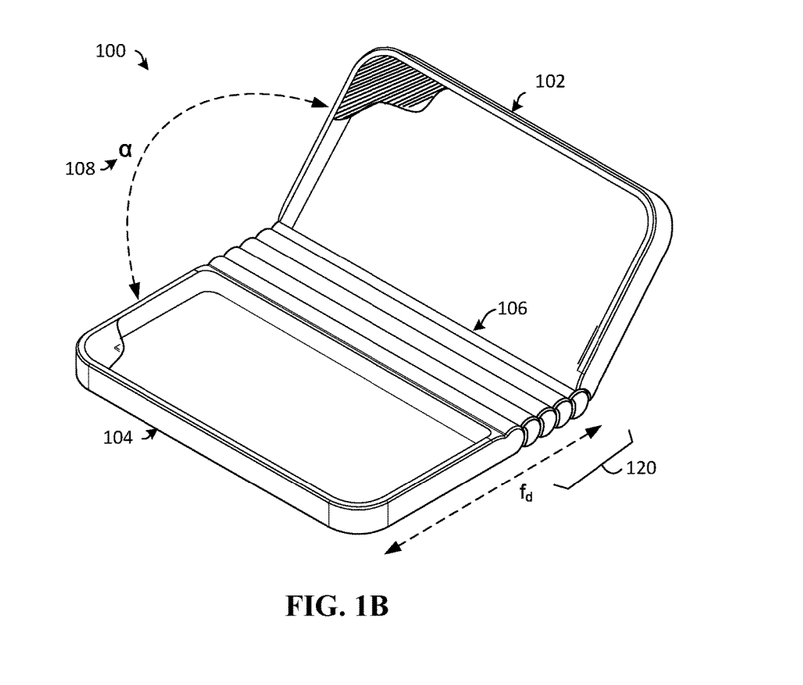
Figure 1C:
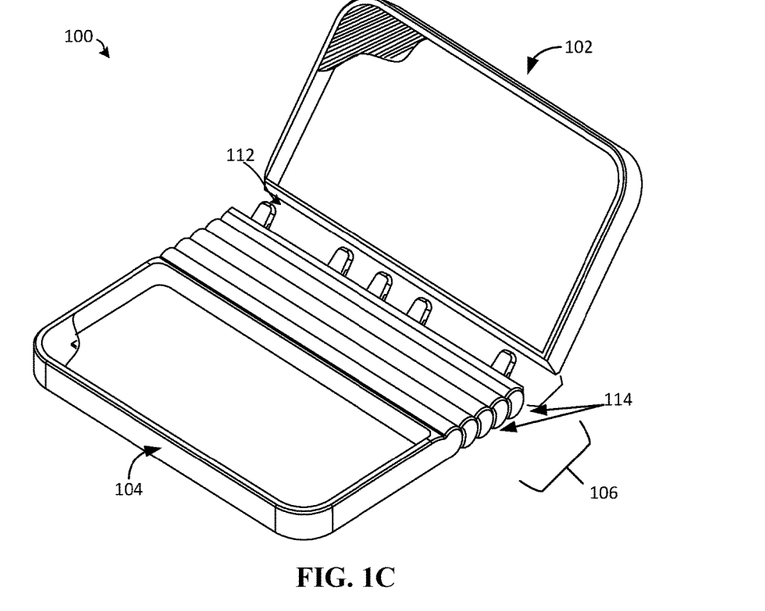

FIGS. 1A-1C illustrate perspective views of an example device that includes removable couplers for a sequential multi-pivot hinge assembly. In an example, illustrated by FIGS. 1A-1C, computing device 100 may be a computing device having a first portion 102 and a second portion 104 rotatably secured together by a multi-pivot hinge assembly 106. The multi-pivot hinge assembly may also be called a sequential multi-pivot hinge assembly. In some examples, the first portion 102 may be a tablet device having a touch screen and the second portion 104 may be an input device.

In an example, the second portion 104 may be a keyboard. Other implementations can employ other input devices. Further, the first portion 102 may include a display screen, such as a touch sensitive display screen. The computing device can also include computing elements such as a processor, memory/storage, a battery, and/or a video or graphics processor, among other components/elements. These elements may be positioned in the first portion 102 and/or second portion 104.

FIG. 1A shows the computing device 100 in a closed position from a "front" view of the computing device 100. In the closed position, each hinge of the multi-hinge assembly 106 is rotated to its individual fully closed position to position the first portion 102 over the second portion 104. In an example shown in FIG. 1A, in the closed position the second portion 104 can be configured to be positioned on a generally horizontal surface such as a table top, and the first and second portions may be generally parallel to one another and the horizontal surface (e.g., the first portion is juxtaposed over the second portion).

In the closed position, the first portion 102 and the second portion 104 may be at a rotational angle of approximately zero degrees relative to each other; however, this closed angle may be more or less depending on the hinge assembly. For example, a device may have a closed angle of around negative two to negative five degrees.

FIG. 1B shows the computing device 100 in an open or deployed position.

In the open position the first portion 102 and the second portion 104 may be at an obtuse angle relative to each other to enable interaction with the first portion 102. The opening angle 108 (shown as a) may be predefined by the design of the multi-pivot hinge and customized depending on the type of device or preference of a user or manufacturer. In some examples, the deployed position may be somewhere in the range of 90 degrees to 180 degrees, depending on a viewer's comfortable viewing angle.

In an example, the opening angle 108 may be around 125-135 degrees. As will be described in further detail, each hinge of the multi-pivot hinge assembly 106 may have maximum allowable degree of rotation, which may be predetermined based on the opening angle 108 desired and defined by the device. That is, the total opening angle divided by the number of hinges of the multi-pivot hinge assembly 106 may determine the allowed degree of rotation of each hinge. The calculated degree of rotation of each hinge of the multi-pivot hinge assembly 106 may also be adjusted to allow for tolerances and to customize the rotation angle of the multi-pivot hinge assembly 106.

In another example, in the open position, the multi-pivot hinge assembly 106 may provide a foot 120 or an extended footprint of the computing device 100 that may increase the stability of the computing device 100 and reduce the likelihood of the computing device 100 tipping over backward in the deployed position from the weight of the device. That is, the sequential nature of the multi-pivot hinge assembly 106 may create the foot 120 in the deployed position that can help stabilize the computing device 100 and decrease tipping (e.g., maintain the center of mass over the footprint).

FIG. 1C shows the computing device 100 in a detached position. In some examples, the multi-pivot hinge assembly 106 can be secured to the first portion 102 and the second portion 104 in a relatively permanent manner via a fastening component (e.g., in a manner that is not intended to be readily separable by an end user). Alternatively, the multi-pivot hinge assembly 106 can be secured to the first portion 102 and the second portion 104 in an attachable/detachable manner as shown in FIG. 1C.

In an example, the multi-pivot hinge assembly 106 may include one or more protrusions 112, or fangs, configured to engage with one or more receptacles of the first portion 102 to attach the multi-pivot hinge assembly 106 to the first portion 102. The protrusions 112 may be configured to engage with receptacles (not shown) of the first portion 102 via a latch mechanism or via a magnetic mechanism enabling a quick and easy attach/detach mechanism for an end user. Other attach/detach assemblies may also contemplated. Similarly, the multi-pivot hinge assembly 106 may attach to the second portion 104 by similar permanent or detachable means as described above.

Alternatively, or additionally to the mechanical coupling described above, the quick attach/detach assembly can enable electronic components of the first portion 102 and the second portion 104 to attach and detach in order to electrically couple processor, storage/memory, and/or battery from the first portion 102 to the graphics processor and/or keyboard in the second portion 104, for example.

Thus, the quick attach/detach assembly can allow the user to be able to detach the first portion 102 or the second portion 104 to use either portion independent of the other. For example, the first portion 102 may be operated as a stand-alone tablet device, and then may be attached to second portion 104 via multi-pivot hinge assembly 106 allow the device to function similar to a laptop device. Additionally, a user may also be able to exchange the first portion 102 or the second portion 104 for application-specific devices. For example, an individual second portion 104 may include a keyboard and/or a touchscreen. In certain scenarios, the user may attach a first touchscreen as the first portion 102 and a second touchscreen as the second portion 104, and utilize the device like a book. In other scenarios, the user may attach a touchscreen as the first portion 102 and an input device, manifest as a keyboard and trackpad, as the second portion 104, and utilize the device like a laptop. Other configurations and implementations may be contemplated.

As also illustrated in FIGS. 1A-1C, the multi-pivot hinge assembly 106 includes articulating hinge covers (e.g., hinge covers 114) that can obscure and/or protect the underlying elements, including the individual frames or hinges of the multi-pivot hinge assembly 106. Each frame or hinge of the multi-pivot hinge assembly 106 may include an individual hinge cover, and each individual hinge cover may overlap with an adjacent hinge cover to visually hide and protect the components of the multi-pivot hinge assembly 106.

Figure 2A:
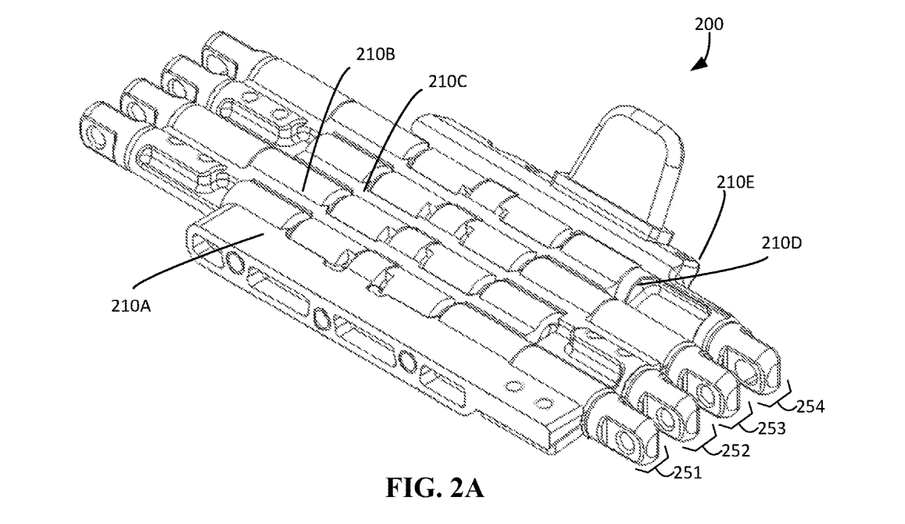
FIGS. 2A-2B illustrate assembled and exploded views of an example multi-pivot hinge assembly.
Figure 2B:
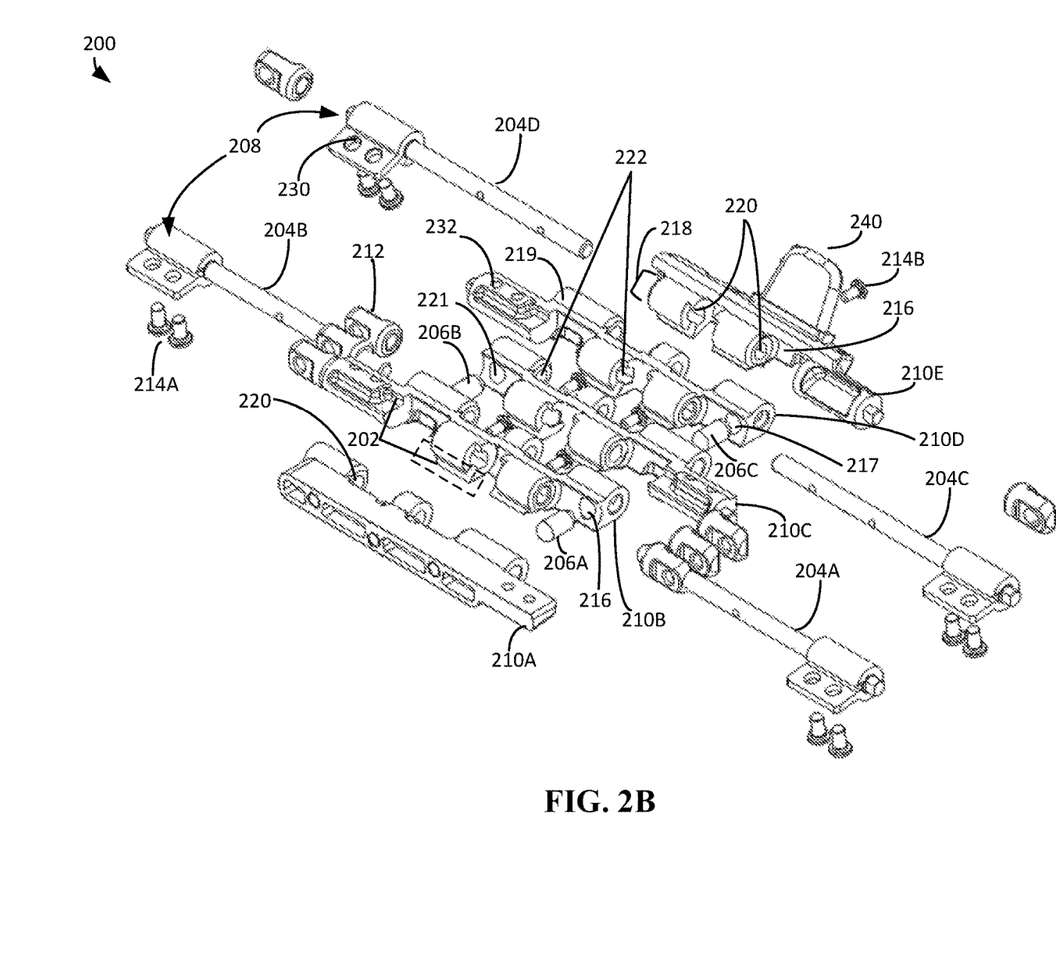
Figure 3:
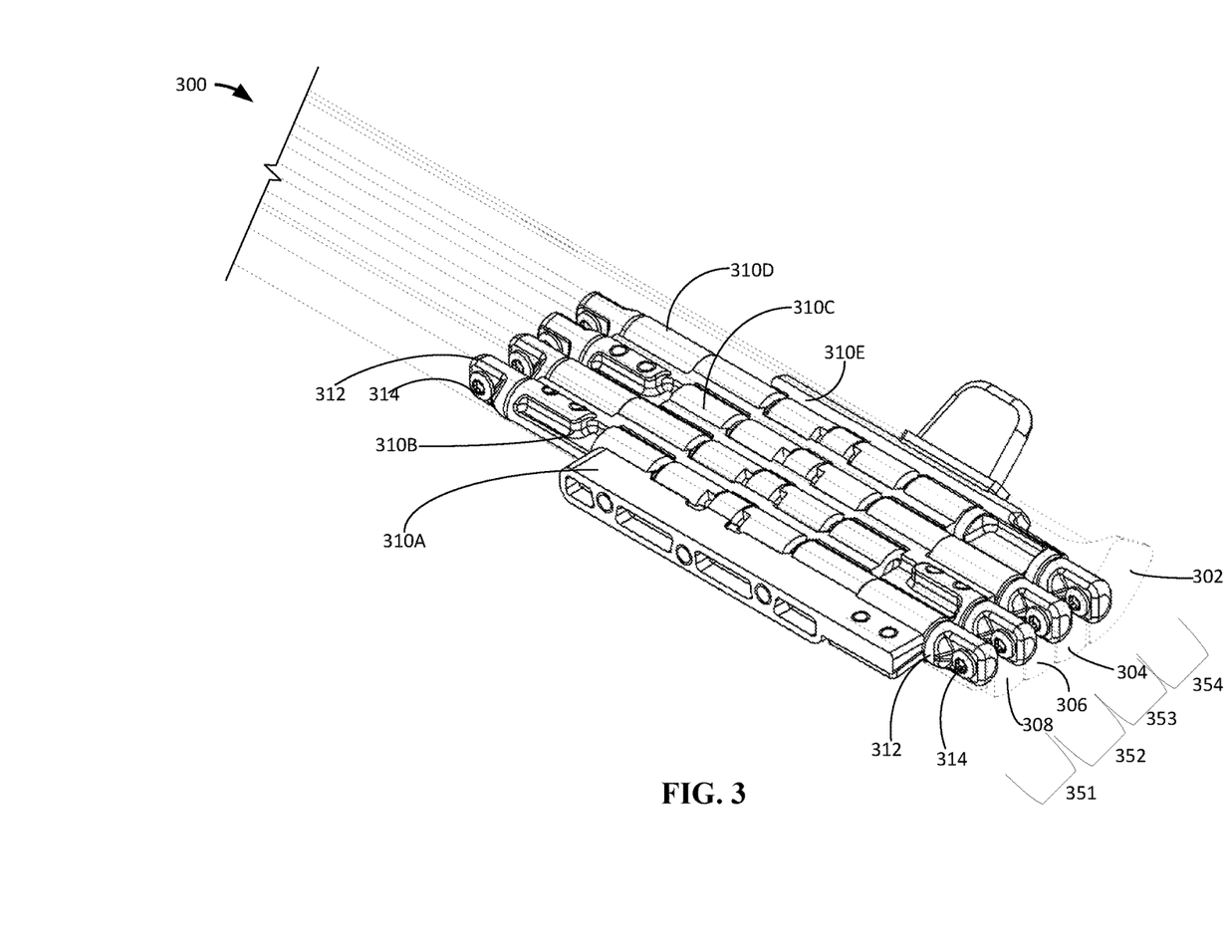
FIG. 3 illustrates an assembled view of a multi-pivot hinge including individual covers and removable couplers on each segment of the multi-pivot hinge.
Figure 4A:
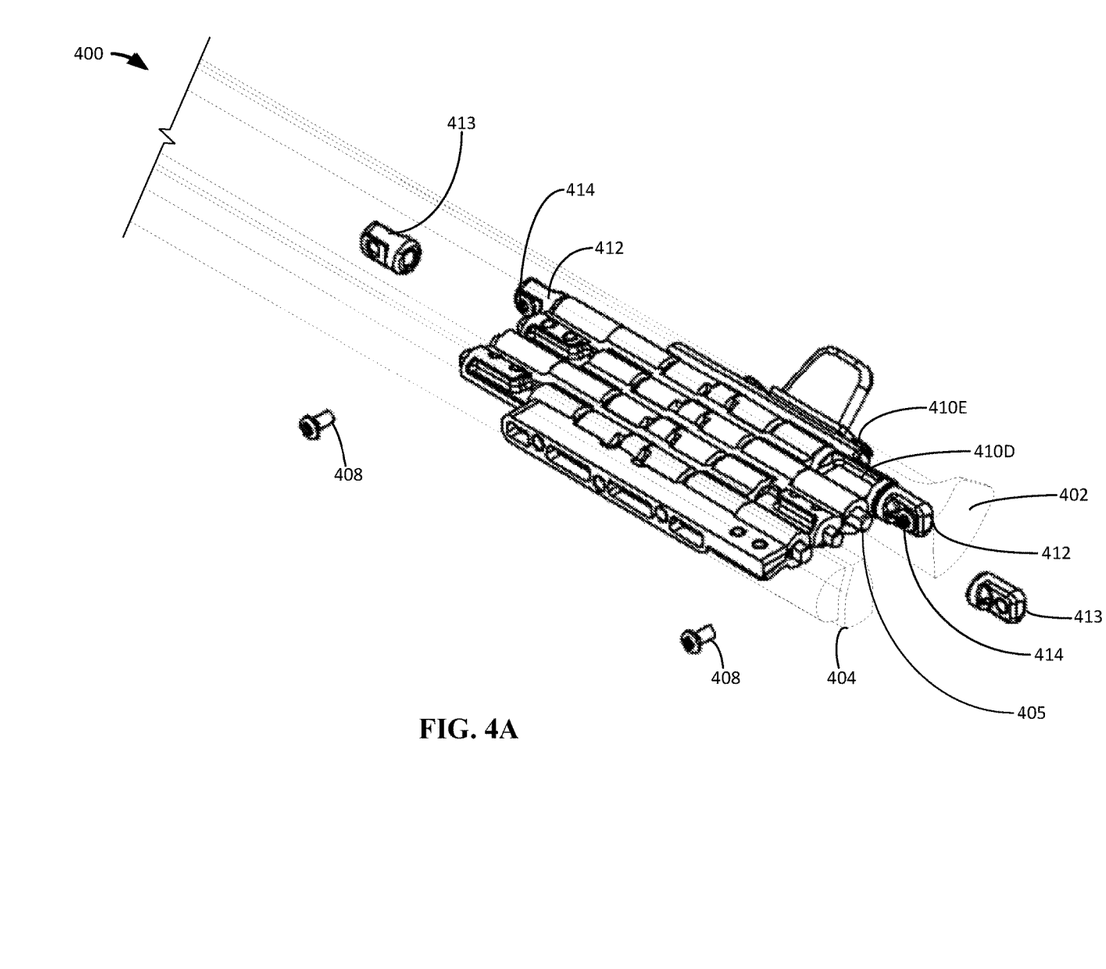
FIGS. 4A-4C illustrate a sequence of assembly of a multi-pivot hinge including attachment of removable couplers, a hinge cover, and a fastening component.
Figure 4B:
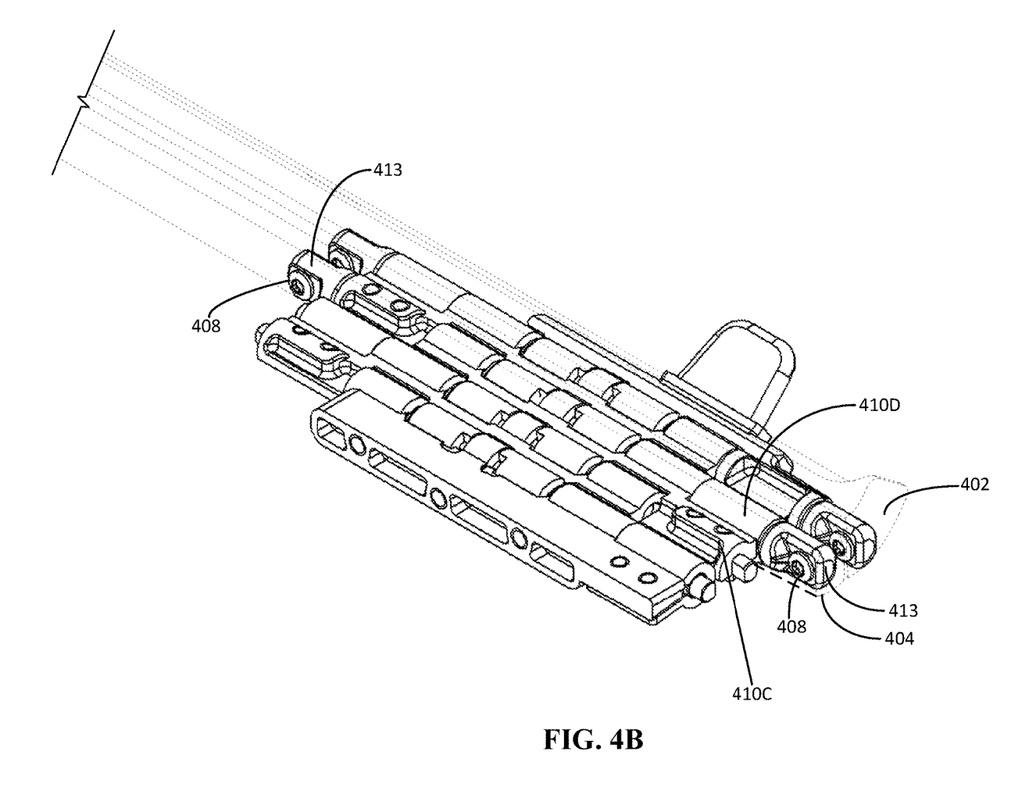
Figure 4C:
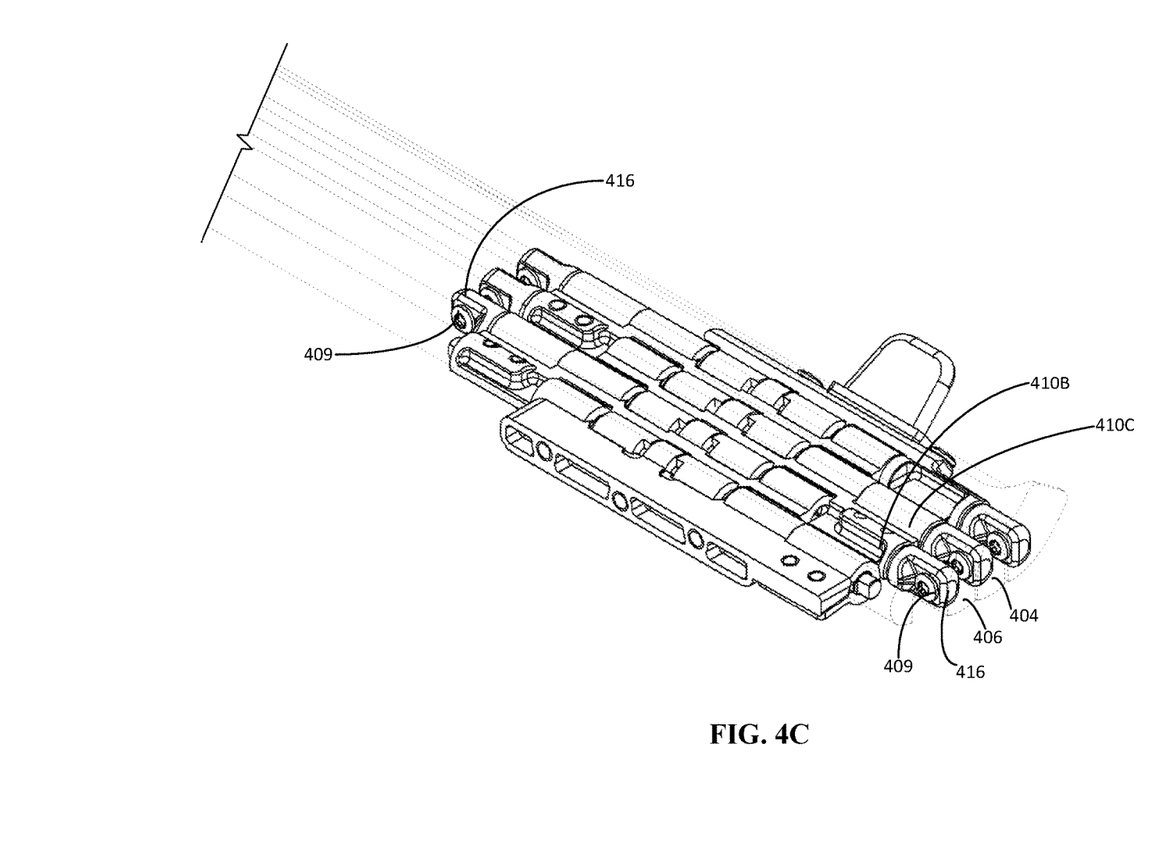

FIGS. 2-4 collectively illustrate more details about the example multi-pivot hinge assembly 200 including the individual frames introduced above. Note that due to space constraints on the drawing pages, not all elements are labeled in each figure, and not every instance of every element is labeled, rather representative elements are labeled.

FIGS. 2A and 2B illustrate assembled and exploded views of an example multi-pivot hinge assembly. FIG. 2A illustrates a perspective assembled view of the fully integrated multi-pivot hinge assembly 200 which includes friction, timing and kinematic components to control the order of rotation, degree of rotation and increasing stability of the module.

As shown in FIG. 2A, the multi-pivot hinge assembly 200 may include a set of frames (e.g., frames 210A, 210B, 210C, 210D, 210E) which function together to create sequential hinges. For example, adjacent frames 210A and 210B create a first hinge 251, adjacent frames 210B and 210C create a second hinge 252, adjacent frames 210C and 210D create a third hinge 253, and adjacent frames 210D and 210E create a fourth hinge 254. As will be discussed in further detail and shown in FIG. 3, each of the hinges may be covered by a hinge cover.

"Fully integrated" as used herein, indicates that each component is a permanent part of the assembly and is manufactured in place, such that the assembly is a fully assembled single unit. In some examples, two or more fully integrated multi-pivot hinge assembly units may be used together to form a fully functioning hinge assembly. For example, a first multi-pivot hinge assembly may be on a first end and a second multi-pivot hinge assembly may be on a second end, where each hinge of the multi-pivot hinge assemblies is joined by a set of overlapping hinge covers.

As shown in FIG. 2B, an exploded view of the multi-pivot hinge assembly 200, components may include individual frames (e.g., frames 210A, 210B, 210C, 210D, 210E), which include rotation limiting surfaces 202, two or more sequencing pins 206, two or more shafts 204, friction bands 208, removable couplers 212, and fasteners 214. Each individual hinge frame (e.g., frames 210A, 210B, 210C, 210D, 210E) may also include a plurality of cam surfaces 216 for engaging the sequencing pins 206 and controlling sequential rotation of each hinge frame 210. The sequencing pins 206 may be thought of as locking cam members that slide laterally within a slot 217 near an end of a frame (e.g., slot 217 shown near frame 210D) and engage and disengage with opposing cam surfaces 216 of the frames (e.g., frames 210A, 210B, 210C, 210D, 210E). One or more additional slots may be formed between adjacent frames to accommodate the one or more other sequencing pins 206 of the multi-pivot hinge module. In a system according to certain embodiments, one or more of the components of the multi-pivot hinge assembly may be composed from steel.

In a system according to certain implementations, the multi-pivot hinge assembly 200 may include five radially arranged frames (e.g., frames 210A, 210B, 210C, 210D, 210E), however more or less frames may be used in other embodiments. The frames (e.g., frames 210A, 210B, 210C, 210D, 210E) may include a base frame 210A which may be configured to attach to a second portion or input device of a computing device, and a receiving frame 210E which may be configured to attach to a first portion, such as a tablet or display screen of a computing device via a fang protrusion 240. The multi-pivot hinge assembly may also include three middle frames, 210B, 210C, and 210D. Each of the individual frames may be configured to couple together via offset portions (e.g., offset portion 218) that correspond with opposing offset portions (e.g., offset portion 219) of adjacent frames.

In an example, the offset portions include openings or passageways (e.g., passageway 220). When adjacent frames are coupled together, the passageways of each offset portion may align to enable insertion of a shaft 204. For example, when frame 210E is coupled with adjacent frame 210D, the passageways of each frame's offset region (for example offset portion 218 and offset portion 219) may align to form passageway 220. Likewise, when frame 210D is coupled with adjacent frame 210C, the passageways of each frame's offset regions may align to form another passageway 222. A shaft (e.g., shaft 204) may be inserted in the passageway formed between coupled adjacent frames to rotatably secure the adjacent frames together. Each shaft 204 defines the axis of rotation that each of the frames may rotate (or pivot) around.

Referring to FIG. 2B, receiving frame 210E may be rotatably secured to frame 210D by shaft 204D, frame 210D may be rotatably secured to frame 210C by shaft 204C, frame 210C may be rotatably secured to frame 210B by shaft 204B, and frame 210B may be rotatably secured to frame to base frame 210A by shaft 204A. Each shaft may define the axis of rotation of a sequential hinge formed by adjacent frames, such that there are four axes of rotation associated with a five-frame multi-pivot hinge. These axes of rotation may be "hinges" of the multi-pivot hinge assembly.

In an implementation, the shafts 204 may not have a circular profile when viewed transverse their long axis but may be keyed in a unique shape. For example, the shafts 204 may have a profile that approximates a capital "D". Each passageway may have a similar profile so that the haft is keyed or locked and prevented from rotating within the passageway. It is contemplated that other keyed shaft profiles can be utilized that cause the shaft to be non-rotatable.

In an additional implementation, each shaft 204 may include a friction band 208 on at least one end of the shaft that may act as a friction interface between the frames (e.g., frames 210A, 210B, 210C, 210D, 210E) to provide an arresting force for the attached device. The friction bands 208 may control friction via interference. That is, the friction bands 208 may be undersized relative to a shaft diameter, and the shaft 204 may cause the band to expand when the band is inserted over the shaft. An amount of friction may be adjusted by factors such as a thickness and length of the friction band 208, the diameter of the shaft 204, a type of grease used, and other known friction technologies. Various types of friction bands 208 may be contemplated.

In one example, the friction bands 208 may be sheet metal bands that are wrapped around the shaft 204 and secured to a frame via a plurality of fasteners 214A. The fasteners 214A may secure the friction bands to corresponding frames via a plurality of holes 230 formed in the friction band 208 that may overlap with a plurality of holes 232 formed in a corresponding frame. The plurality of holes formed in the corresponding frame may be threaded to engage the fasteners. In another example, the friction band 208 may be a metal injection molded band (MIM) made out of a separate metal injection molded part and engaged with an end of the shaft. In another example, a MIM band can be integrated with or manufactured attached to the frame assembly, and in yet another embodiment, the friction band may include axial thrust using washers that are axially spring loaded and move relative to each other to control the friction.

Additionally, after insertion of the shafts 204 through the passageways to couple adjacent frames (e.g., frames 210A, 210B, 210C, 210D, 210E), the shafts 204 may be secured to the frames via a plurality of fasteners 214B, which may be configured to bias the shafts 204 against a frame to eliminate free play or "floating" between the shafts 204 and the frame passageway (e.g., passageways 220 and 222). Furthermore, a set of removable couplers 212 may be inserted over a distal end of each shaft. The removable couplers 212 may include a plurality of holes for attachment of hinge covers to each of the frames (e.g., frames 210A, 210B, 210C, 210D, 210E) via another set of fasteners (shown in FIG. 3).

In an implementation, each of the offset portions (e.g., offset portions 218 and 219) of the frames may include rotation limiting surfaces 202. The rotation limiting surfaces 202 may define the degrees of rotation of each frame around an individual axis of rotation defined by the shaft 204. The rotation limiting surfaces 202 are shown in FIG. 2B as notches and grooves that engage with each other during rotation and prevent rotation beyond a defined number of degrees.

In a further implementation, a set of sequencing pins 206 may interact with opposing cam surfaces 216 of adjacent frames (e.g., frames 210A, 210B, 210C, 210D, 210E) to control a timing and order of rotation about the individual axes of rotation associated with each frame hinge (e.g., hinges 251-254 shown in FIG. 2A). The opposing cam surfaces 216 may be coordinating concave and convex surfaces that enable the frames to rotate smoothly as a hinge. As will be discussed in more detail below in association with FIG. 4, the sequencing pins 206 may be sliding elements that cam off opposing frame cam surfaces (e.g., cam surfaces 216) to lock and unlock individual sequencing pins 206. The sequencing pins (e.g., sequencing pins 206A, 206B, 206C may slide in a channel or a slot formed by a recessed portion on an end of each frame between two frames having opposing cam surfaces 216. The slots are shown in FIG. 2 as slots 216, 217 and 221. As shown in FIG. 2, sequencing pin 206A may slide through slot 216, sequencing pin 206B may slide through slot 221, and sequencing pin 206C may slide through slot 217. The slots (e.g., slots 216, 217 and 221) may be thought of as a hole or a channel that is formed within each frame and enable the sequencing pins to slide between frames in a direction perpendicular to the frames. The cam surfaces 216 may be embedded into each of the frames to enable the sequencing pins 206 to slide between the frames (e.g., frames 210A, 210B, 210C, 210D, 210E) to enable the hinges to lock and unlock to rotate. Such a configuration can allow the multi-pivot hinge assembly to roll and unroll in a controlled sequential manner by causing only one hinge to rotate at a time.

In some examples, two of the sequencing pins (e.g., pins 206A and 206C) may be located near a front side of the multi-pivot hinge assembly and an additional pin (e.g., pin 206B) may be located near a back side of the multi-pivot hinge assembly. Front and back sides are used for purposes of this view displayed in FIG. 2A. The sequencing pins 206 together with the rotation limiting surfaces 202 of each frame (e.g., frames 210A, 210B, 210C, 210D, 210E) may control the timing, order, and a degree of rotation of each hinge of the multi-pivot hinge assembly 200.

FIG. 3 illustrates an assembled view of a multi-pivot hinge including individual covers and removable couplers on each segment of the multi-pivot hinge.

In an example, the multi-pivot hinge assembly 300 includes overlapping hinge covers (e.g., hinge covers 302, 304, 306, 308) that can obscure and/or protect the underlying hinge elements, including the individual frames or hinges of the multi-pivot hinge assembly 300. In the assembled view, the hinge covers (e.g., hinge covers 302, 304, 306, 308) effectively cover and obscure the other hinge elements. Covering the other hinge elements can protect the other hinge elements from damage, such as from a foreign object like a pen or zipper that might get caught in the hinge elements during rotation and damage the hinge elements. Similarly, without the protection offered by the integrated hinge covers (e.g., hinge covers 302, 304, 306, 308), the user could get pinched by the other hinge elements during hinge rotation. Further, the hinge covers (e.g., hinge covers 302, 304, 306, 308) can create a more aesthetically pleasing hinge appearance and thereby an overall aesthetically pleasing computing device appearance. The hinge covers (e.g., hinge covers 302, 304, 306, 308) can also contribute structurally to the hinge functionality and thus the hinge covers can be thought of as integrated with the multi-pivot hinges in that they (e.g., the hinge covers) can be dual function elements that contribute to both the hinge functionality and the hinge cover functionality.

In an example, adjacent frames may form a hinge, and each hinge of the multi-pivot hinge assembly 300 may include an individual hinge cover. Each individual hinge cover may overlap with an adjacent hinge cover to visually hide and protect the components of the multi-pivot hinge assembly. For example, as shown in FIG. 3, a first hinge cover 308 may cover a first hinge 351 formed by adjacent frames 310A and 310B, a second hinge cover 306 may cover a second hinge 351 formed by adjacent frames 310B and 310C, a third hinge cover 304 may cover a third hinge 353 formed by adjacent frames 310C and 310D, and a fourth hinge cover 302 (also called a receiver cover) may cover a fourth hinge 354 formed adjacent frames 310D and receiver frame 310E.

As discussed above, the frames of the multi-pivot hinge assembly may be rotatably secured together by a shaft where each shaft defines the axes of rotation or the hinges (e.g., hinges 351-354). A plurality of removable couplers 312 may be configured to engage the ends of each shaft to enable the hinge covers 302, 304, 306, 308 to be installed sequentially over each hinge 351-354, and to be secured in place by a plurality of fasteners 314. Since the hinge covers 302, 304, 306, 308 are individual components and are installed sequentially and enabled to rotate independent of each other, the plurality of removable couplers 312 are configured to be removable to allow each cover to be installed separately.

FIGS. 4A-4C illustrate a sequence of assembly of a multi-pivot hinge assembly 400 including attachment of removable couplers, a hinge cover, and a fastening component.

During assembly, each hinge cover is installed over a hinge formed by adjacent frames and is secured in place via fastening components engaged with a set of removable couplers. Due to the sequential nature of the hinge covers, each hinge cover is installed one at a time and fastened in place before a next hinge cover is installed.

Thus, as shown in FIG. 4A, a receiver cover 402 may be inserted over a receiver frame 410E and a portion of adjacent frame 410D. A set of removable couplers (e.g., removable couplers 412 and 413) are engaged over a shaft that couples adjacent frames. For example, as shown in FIG. 4A, a shaft (hidden by removable couplers 412) couples frame 410D to receiver frame 410E, and a set of removable couplers 412 are engaged on the end of the shaft to secure the shaft in place. As also shown, another shaft, e.g., shaft 205, couples frame 410C to 410D, and another set of removable couplers 413 are in position to be engaged on the end of the shaft 205. The removable couplers (e.g., removable couplers 412 and 413) may be keyed to match a unique shape of each shaft (e.g., shaft 405, and thus the keyed shape of the removable couplers 412 may hold the removable couplers (e.g., removable couplers 412 and 413) in place and prevent rotation of the removable couplers (e.g., removable couplers 412 and 413) about the shaft.

The removable couplers (e.g., removable couplers 412 and 413) may include one or more holes configured to align with one or more holes formed in the receiver cover 402 to receive a fastening component 414. One or more of the holes formed in the receiver cover 402 and/or the removable couplers (e.g., removable couplers 412 and 413) may be threaded. For example, in one embodiment, the holes formed in the receiver cover 402 may be threaded and the holes formed in the removable couplers (e.g., removable couplers 412 and 413) may be through holes. The fastening components 414 may be inserted through the holes in the removable couplers (e.g., removable couplers 412 and 413) and screw into the threaded holes in the receiver cover 402. The fastening components 414, e.g., threaded screws, may be inserted through the aligned holes of the receiver cover 402 and the removable couplers (e.g., removable couplers 412 and 413), and may secure the receiver cover 402 to the corresponding frame. The fastening components 414 attaching the receiver cover 402 to the receiver frame 410E may also be configured to counteract a reaction force experienced on the receiver cover 402 during opening and closing of a device attached to the receiver frame 410E.

As also shown in FIG. 4A, a next hinge cover, e.g., a third hinge cover 404 in this example, is positioned to be installed over the next hinge. A second set of removable couplers 413 are positioned to be engaged over a shaft 405 which couples frame 410C to frame 410D. The second set of removable couplers 413 may be engaged in place over the shaft 405, and a third hinge cover 404 may be inserted over frames 410D and 410C and secured via a second set of fasteners 408. Securing of the third hinge cover 404 is illustrated in FIG. 4B.

FIG. 4B shows the third hinge cover 404 in place over frames 410C and 410D and over the second set of removable couplers 413 and adjacent to the receiver cover 402. The second set of fasteners 408 may be inserted through holes formed in the third hinge cover 404 and aligned with holes formed in the second set of removable couplers 413. The holes formed in the second set of removable couplers 413 may be threaded to accept the fastening components.

FIG. 4C shows the next hinge cover, a second hinge cover 406, installed over the next hinge associated with frames 410B and 410C and adjacent to third hinge cover 404. Similar to the previous hinge, a third set of removable couplers 416 are engaged over a shaft (hidden) which couples frame 410C to frame 410B, and after the third set of removable couplers 416 are in place, the second hinge cover 406 may be installed and secured via a third set of fasteners 409. This process may repeat for the fourth hinge cover to complete the hinge cover assembly.

Figure 5:
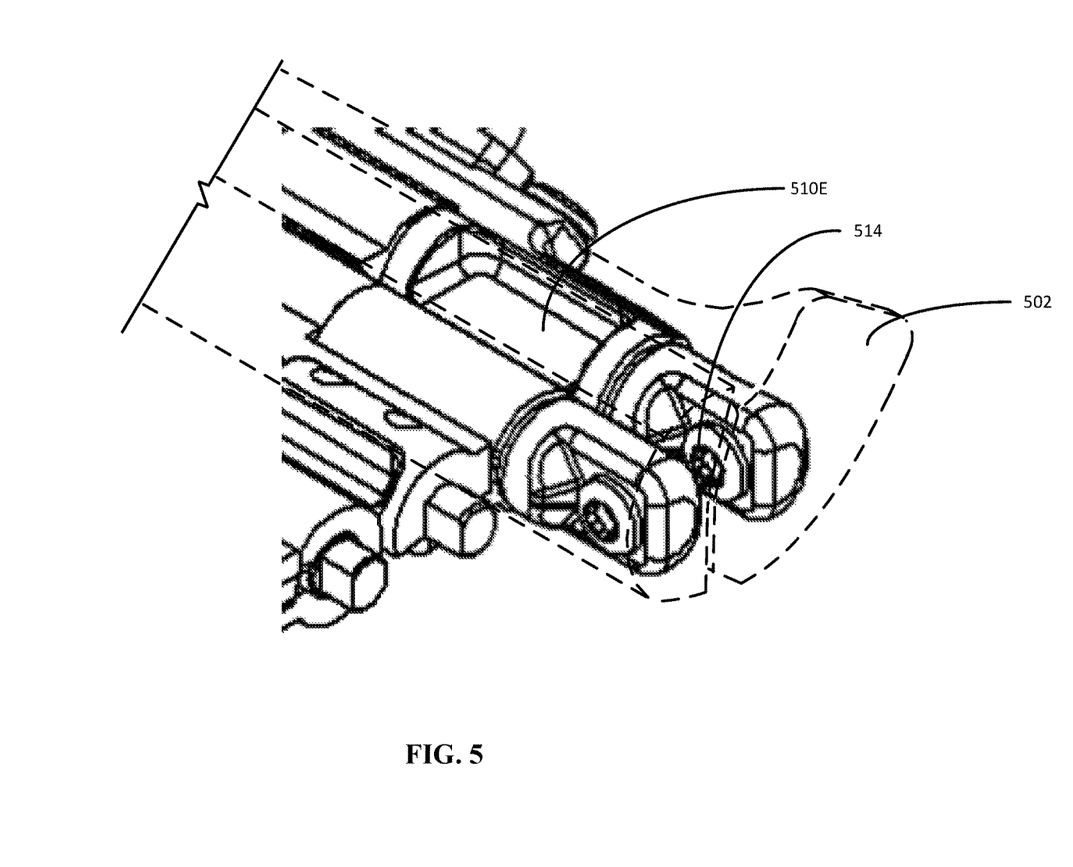
FIG. 5 illustrates a view of a fastening component for attaching a hinge cover to removable couplers.

FIG. 5 illustrates a view of fastening components for attaching a hinge cover to removable couplers. The fastening components may be a set of threaded screws configured to be inserted through holes formed in the hinge covers and the removable couplers. A first set of fastening components 514 for attaching a receiver cover 502 to a receiver frame 510E may also be configured to counteract a reaction force experienced on the receiver cover during opening and closing of a device attached to the receiver frame 510E.

The detailed description provided above in connection with the appended drawings is intended as a description of examples and is not intended to represent the only forms in which the present examples may be constructed or utilized.

Certain aspects of the invention provide the following non-limiting examples.

In an example, technologies are described for a multi-pivot hinge module which may include a set of radially arranged sequential frames rotatably coupled together via one or more coupling shafts, a set of individual overlapping hinge covers, and a plurality of removable couplers configured to be engaged on exposed ends of the one or more coupling shafts to secure each individual hinge cover to an individual frame of the set of radially arranged sequential frames. The sequential frames may include opposing offset regions that fit with together with corresponding inset regions of an adjacent frame, and wherein each offset region includes a central opening that when individual adjacent frames are coupled together creates a passageway for the one or more coupling shafts to pass through.

In an example further to any of the above examples, the one or more coupling shafts are keyed in a unique shape that matches a shape of the passageway created by coupled adjacent frames. Additionally, a receiving profile shape of the plurality of removable couplers matches the shape of the one or more coupling shafts.

In an example further to any of the above examples, each removable coupler of the plurality of removable couplers includes one or more threaded holes to enable securing an individual hinge cover to an individual frame via a fastening component. The threaded holes of each removable coupler may align with one or more holes formed in an individual hinge cover when the individual hinge cover is inserted in place over an individual frame.

In an example further to any of the above examples, the plurality of removable couplers can be composed from steel. In an example further to any of the above examples, the set of radially arranged sequential frames include a plurality of kinematic components for controlling a degree of rotation of each individual frame. In an example further to any of the above examples, the multi-pivot hinge module may also include a plurality of rotational control elements interposed between the sequential frames, the rotational control elements configured to control a relative sequence of rotation of each of the sequential frames.

Technologies are also described for an integrated multi-pivot hinge assembly, where the multi-pivot hinge assembly includes a first sequential frame that rotates about a first axis and comprises a first plurality of kinematic components for controlling a degree of rotation, a second sequential frame that rotates about a second axis and comprises a second plurality of kinematic components for controlling a degree of rotation, the second sequential frame rotatably coupled to the first sequential frame by a first shaft, at least a third sequential frame that rotates about a third axis and comprises a third plurality of kinematic components for controlling a degree of rotation, the third sequential frame rotatably coupled to the second sequential frame by a second shaft, a first hinge cover positioned over the first sequential frame and secured to the first sequential frame via a first removable coupler engaged over a first end of the first shaft and a second removable coupler engaged over a second end of the first shaft, and a second hinge cover positioned over the second sequential frame and secured to the second sequential frame by a third removable coupler engaged over a first end of the second shaft and a fourth removable coupler engaged over a second end of the second shaft.

In an example further to any of the above examples, the integrated multi-pivot hinge assembly also includes a set of rotational control elements interposed between the first, second and third sequential frames, the set of rotational control elements configured to control a relative sequence of rotation of the individual sequential frames. Each shaft is configured to be inserted through a passageway created by coupled adjacent frames to rotatably secure the adjacent frames together, and wherein a profile shape of the passageway matches a profile shape of each shaft. In an example further to any of the above examples, a receiving profile shape of each of the removable couplers matches a profile shape of each shaft. The first and the second removable couplers each include one or more threaded holes to enable securing each hinge cover to each corresponding frame via a fastening component. The first and the second removable couplers are composed from steel.

Technologies are also described for a method of assembling a multi-pivot hinge module. The method may include sliding a first hinge cover over a first frame of a multi-pivot hinge module, the first hinge cover including one or more threaded holes for accepting a fastening component, engaging a first set of removable couplers on each exposed end of a first shaft that couples the first frame to a second frame adjacent to the first end frame, the first set of removable couplers including one or more holes for accepting a fastening component, wherein the one or more holes match a location of the one or more threaded holes in the first hinge cover, inserting a fastening component through the one or more holes in the first set of removable couplers and the one or more threaded holes of the first hinge cover to secure the first hinge cover, engaging a second set of removable couplers on each exposed end of a second shaft coupling the second frame to a third frame adjacent to the second frame, the second set of removable couplers including one or more holes for accepting a fastening component, sliding a second hinge cover over the second frame, the second frame including one or more threaded holes, wherein the one or more threaded holes match a location of the one or more holes of the second set of removable couplers, and inserting a fastening component through the one or more holes of the second set of removable couplers and the one or more threaded holes of the second hinge cover to secure the second hinge cover.

The method may also include engaging a next set of removable couplers on each exposed end of a next shaft connecting a next set of adjacent frames, sliding a next hinge cover over a next adjacent frame, and inserting a fastening component to secure the next hinge cover to the next adjacent frame. In an example further to any of the above examples, the fastening component is a threaded screw.

In an example further to any of the above examples, a receiving profile shape of each of the removable couplers matches a profile shape of each of the shafts. In an example further to any of the above examples, each hinge cover is configured to partially overlap with an adjacent hinge cover.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A multi-pivot hinge module comprising:
a set of radially arranged sequential frames rotatably coupled together via one or more coupling shafts;
a set of individual overlapping hinge covers; and
a plurality of removable couplers configured to be engaged on exposed ends of the one or more coupling shafts to secure each individual hinge cover to an individual frame of the set of radially arranged sequential frames;
wherein the sequential frames include opposing offset regions that fit together with corresponding inset region of an adjacent frame, and wherein each offense region includes a central opening that when individual adjacent frames are couple together creates a passageway for the one or more coupling shaft to pass through.

2. The hinge module of claim 1, wherein the one or more coupling shafts are keyed in a unique shape that matches a shape of the passageway created by coupled adjacent frames.

3. The hinge module of claim 2, wherein a receiving profile shape of the plurality of removable couplers matches the shape of the one or more coupling shafts.

4. The hinge module of claim 1, wherein each removable coupler of the plurality of removable couplers includes one or more threaded holes to enable securing an individual hinge cover to an individual frame via a fastening component.

5. The hinge module of claim 4, wherein the threaded holes of each removable coupler align with one or more holes formed in an individual hinge cover when the individual hinge cover is inserted in place over an individual frame.

6. The hinge module of claim 1, wherein the plurality of removable couplers is composed from steel.

7. The hinge module of claim 1, wherein the set of radially arranged sequential frames include a plurality of kinematic components for controlling a degree of rotation of each individual frame.

8. The hinge module of claim 1, further comprising a plurality of rotational control elements interposed between the sequential frames, the rotational control elements configured to control a relative sequence of rotation of each of the sequential frames.

9. An integrated multi-pivot hinge assembly comprising:
a first sequential frame that rotates about a first axis and comprises a first plurality of kinematic components for controlling a degree of rotation;
a second sequential frame that rotates about a second axis and comprises a second plurality of kinematic components for controlling a degree of rotation, the second sequential frame rotatably coupled to the first sequential frame by a first shaft;
at least a third sequential frame that rotates about a third axis and comprises a third plurality of kinematic components for controlling a degree of rotation, the third sequential frame rotatably coupled to the second sequential frame by a second shaft;
a first hinge cover positioned over the first sequential frame and secured to the first sequential frame via a first removable coupler engaged over a first end of the first shaft and a second removable coupler engaged over a second end of the first shaft; and
a second hinge cover positioned over the second sequential frame and secured to the second sequential frame by a third removable coupler engaged over a first end of the second shaft and a fourth removable coupler engaged over a second end of the second shaft.

10. The integrated multi-pivot hinge assembly of claim 9, further comprising:
a set of rotational control elements interposed between the first, second and third sequential frames, the set of rotational control elements configured to control a relative sequence of rotation of the individual sequential frames.

11. The hinge assembly of claim 9, wherein each shaft is configured to be inserted through a passageway created by coupled adjacent frames to rotatably secure the adjacent frames together, and wherein a profile shape of the passageway matches a profile shape of each shaft.

12. The hinge assembly of claim 9, wherein a receiving profile shape of each of the removable couplers matches a profile shape of each shaft.

13. The hinge assembly of claim 9, wherein the first and the second removable couplers each include one or more threaded holes to enable securing each hinge cover to each corresponding frame via a fastening component.

14. The hinge assembly of claim 13, wherein the first and the second removable couplers are composed from steel.

* * * * *